United States Patent [19]

Shen

[11] 4,366,425
[45] Dec. 28, 1982

[54] TIMER-CONTROLLED SPEED CHANGING DEVICE FOR ELECTRIC FANS

[76] Inventor: Chou-Ming Shen, 68-38 Yen Chi St., Taipei, Taiwan

[21] Appl. No.: 256,118

[22] Filed: Apr. 21, 1981

[51] Int. Cl.³ .............................................. H02P 1/26
[52] U.S. Cl. ..................................... 318/779; 318/445
[58] Field of Search ............... 318/445, 305, 306, 400, 318/446, 484, 772, 779, 784, 268, 271, 276, 301, 384, 385, 386, 391; 236/46 R, 35, 74 R, DIG. 9

[56] References Cited

U.S. PATENT DOCUMENTS

| | | | |
|---|---|---|---|
| 2,081,977 | 6/1937 | Bendz | 318/271 |
| 2,091,665 | 8/1937 | Weber | 318/779 |
| 2,752,044 | 6/1956 | Olcott | 318/385 X |
| 3,248,632 | 4/1966 | Bowman | 318/772 X |
| 3,594,625 | 7/1971 | Richardson | 318/268 X |

Primary Examiner—Ulysses Weldon
Attorney, Agent, or Firm—Shoemaker and Mattare, Ltd.

[57] ABSTRACT

A timer-controlled speed changing device for electric fans comprising a timing switch operatively connected to a first speed changing circuit and a second speed changing circuit, for changing the speed of an electric fan from a pre-set speed with the first or second speed changing circuit to another pre-set speed with the second or first speed changing circuit after a predetermined time period set by the timing switch.

6 Claims, 8 Drawing Figures

TIMER-CONTROLLED SPEED CHANGING DEVICE FOR ELECTRIC FANS

BACKGROUND OF THE INVENTION

Conventional electric fans are generally provided with a speed changing device. Such a device may be a multiple-step speed selector adapted to selectively change the speed of an electric fan among various predetermined speeds, or a stepless speed changer capable of selectively changing the speed of an electric fan within certain speed range steplessly. However, there is an inconveniency in conventional speed changing devices because the device has to be operated manually when one wants to change the speed of an electric fan. Though a timing switch may be used to start or to stop an electric fan at a certain pre-set time, it is only good for starting or stopping the electric fan. It is particularly bothersome in the night when one has to get up to operate the speed changing device when the room temperature changes and one wants to increase or reduce the speed of the electric fan rather than just to start or to stop.

Therefore, it is the main object of this invention to provide a timer-controlled speed changing device for changing the speed of an electric fan in a pre-set time from one speed to another.

DETAILED DESCRIPTION OF THE INVENTION

This invention relates to a speed changing device for electric fans, more particularly to a timer-controlled speed changing device having a timing switch operatively connected to a first speed changing circuit and to a second speed changing circuit for changing the speed of an electric fan from one speed to another in a predetermined time.

Figure 1:
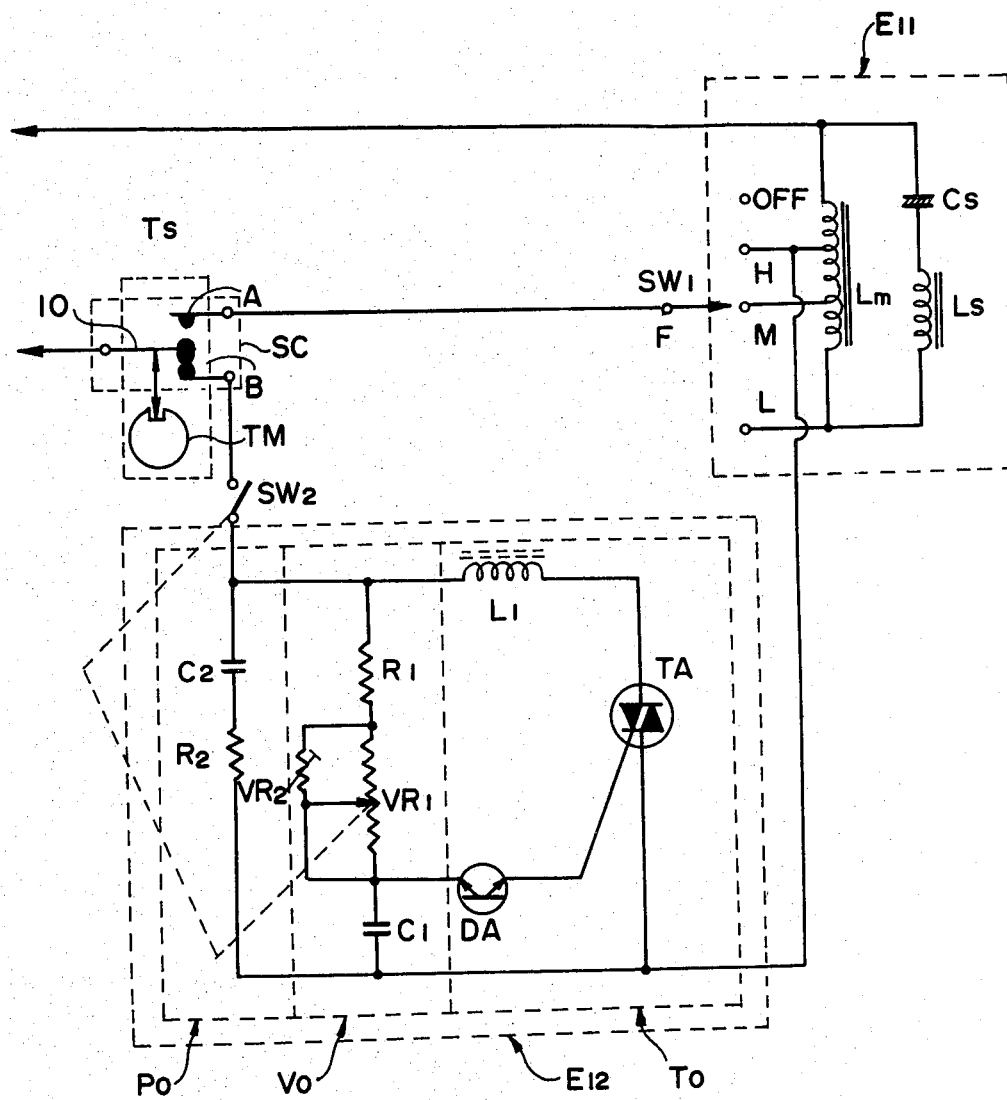
FIG. 1 is a circuit diagram of a first embodiment of the timer-controlled speed changing device of this invention.

As shown in FIG. 1, the first embodiment of the timer-controlled speed changing device of this invention comprises a timing switch TS, a first selector switch $SW_1$ and a second selector switch $SW_2$, a first speed changing circuit $E_{11}$ selectively electrically connected to said first selector switch $SW_1$, and a second speed changing circuit $E_{12}$ selectively electrically connected to said second selector switch $SW_2$; said timing switch TS being provided with switch means SC having a first contact terminal A electrically connected to said first selector switch $SW_1$, a second contact terminal B electrically connected to said second selector switch $SW_2$, a switch piece 10 connected to a power source and a timing unit TM adapted to operate said switch piece 10 so that the switch piece 10 is brought into contact with the second contact terminal B from the position where it is in contact with the first contact terminal A at a certain pre-set time.

Figure 2:
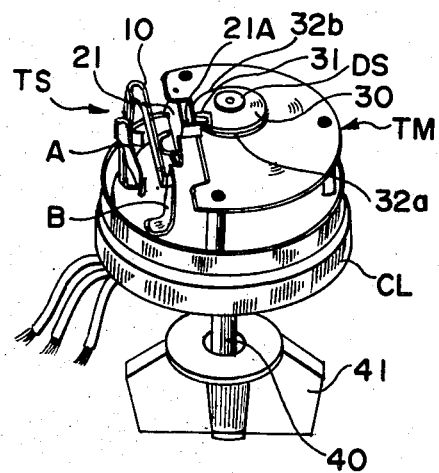
FIG. 2 is an oblique, perspective view of a timing switch according to this invention.
Figure 4:
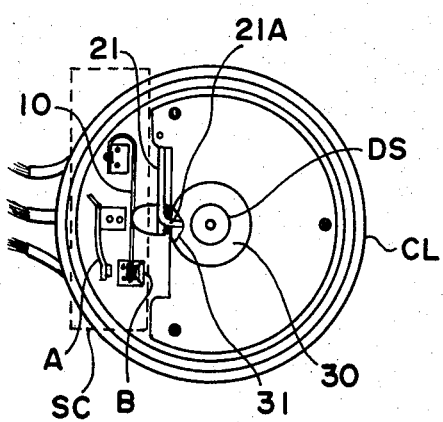
FIG. 4 is a top view of the timing switch shown in FIG. 2, showing a second condition in which the switch piece is in contact with a second contact terminal B.
Figure 3:
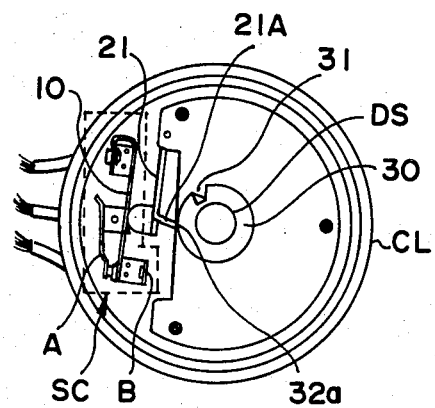
FIG. 3 is a top view of the timing switch shown in FIG. 2, showing a first condition in which the switch piece is in contact with a first contact terminal A.

Referring to FIGS. 2, 3 and 4, the timing unit TM comprises a clock unit CL having a drive shaft DS, a cam 30 having a notch 31 and fixedly mounted on said drive shaft DS, and a follower 21 having a tongue 21A and being pivotally mounted so that said tongue 21A is capable of moving toward and away from said cam 30. The switch means SC is mounted on the upper part of said clock unit CL in such a manner that said switch piece 10, which is made of a resilient material, is arranged to resiliently urge the follower 21 toward the cam 30, and thus the tongue 21A is constantly resiliently kept in contact with the periphery of the cam 30.

The clock unit CL is provided with a drive shaft DS on which the cam 30 is fixedly mounted. Said drive shaft DS is driven to rotate by a driving mechanism when the clock unit CL is "set", which can be an electric-motor or a spring-driven clockwork, through a suitable time mechanism, not shown. When said drive shaft rotates, the cam 30 rotates accordingly. As shown in FIG. 2, the clock unit CL is further provided with a spindle 40 having a handle 41 which is coupled to the drive shaft DS in such a manner that when the spindle 40 is rotated counterclockwise (viewed from top), drive shaft DS and cam 30 are rotated accordingly and the time corresponding to the angle of rotation of the cam 30 is set, and the cam starts to rotate clockwise as soon as the spindle 40 is released. When the spindle 40 is rotated clockwise, the drive shaft DS and cam 30 are rotated accordingly without setting the clock unit, and the cam 30 remains in the position to which it is rotated.

The switch means SC is so arranged that when the tongue 21A is in contact with the periphery 32a of the cam 30, the switch piece 10 will be in contact with the contact terminal A as shown in FIG. 3, and when the tongue 21A engages with the notch 31, the switch piece 10 will be in contact with the contact terminal B.

The contact terminal A is electrically connected to the first selector switch $SW_1$, which is adapted to be selectively electrically connected to the first speed changing circuit $E_{11}$. As shown in FIG. 1, said first speed changing circuit $E_{11}$ comprises a field winding $L_m$ of an electric fan, a starting winding $L_s$ and a starting capacitor Cs; said field winding being provided with a plurality of taps draw therefrom, each tap being provided with a tap terminal designated with H for high speed, M for medium and L for low, respectively, to be selectively connected to the contact terminal A with the selector switch $SW_1$. An extra terminal OFF is provided to designate the position with which the first speed changing circuit $E_{11}$ is to be disconnected from the timing switch TS.

The contact terminal B is electrically connected to the second selector switch $SW_2$, which is connected to a second speed changing circuit $E_{12}$ comprising a voltage control circuit $V_o$, a protection circuit $P_o$ and a triac circuit $T_o$; said voltage control circuit $V_o$ comprising a variable resistor $VR_1$, a semi-variable resistor $VR_2$ connected in parallel with said variable resistor $VR_1$, a resistor $R_1$ and a capacitor $C_1$; said protection circuit $P_o$ comprising a capacitor $C_2$ and a resistor $R_2$; said triac circuit $T_o$ comprising a triac TA, an inductor $L_1$ and a diac DA connected as shown in FIG. 1, wherein a first anode of triac TA is shown connected with a tap terminal H of the first speed changing circuit $E_{11}$, a second anode of TA is connected with inductor L1, a gate of triac TA is connected to one of the two leads of diac DA, and the other lead of diac DA is connected as shown to the junction of components $VR_1$, $VR_2$ and Cl of voltage control circuit $V_o$. The second speed charging circuit $E_{12}$ as described above is thus connected to a tap terminal H of the first speed changing circuit $E_{11}$.

Said voltage control circuit $V_o$ in the second speed changing circuit $E_{12}$ is adapted to supply a voltage that can be varied by adjusting the variable resistor $VR_1$ to triac TA through diac DA, so that the emitting angle of the output of the triac TA in each half cycle can be varied and thus the voltage applied to the field winding $L_m$ of the electric fan can be varied to change the speed accordingly. In this arrangement, the voltage supplied from the voltage control circuit $V_o$ controls or energizes triac TA through diac DA; the semi-variable resistor $VR_2$ further provides variation of resistance in addition to variable resistor $VR_1$; the protection circuit $P_o$ protects triac TA from electrical surge; and the inductor $L_1$ smooths the outputs of triac TA. The variable resistor $VR_1$ is preferably operatively connected to the second selector switch $SW_2$ to enable the operation of the second speed changing circuit $E_{12}$ in association with the operation of the second selector switch $SW_2$.

The second speed changing circuit $E_{12}$ as described above provides a stepless variation of speed and thus providing a wide range of speed selections, and, as symbolically shown in FIG. 1, variable resistor $VR_1$ may be operable in association with the operation of $SW_2$.

The operation and function of the first embodiment of the device of this invention will be described as follows.

Assuming one wants to use an electric fan equipped with the device of this invention for a certain period at a higher speed and then to switch to a lower speed; first the timing switch TS is set to cause the switch piece 10 to come into contact with contact terminal B, thus energizing the second speed changing circuit $E_{12}$, in other words the spindle 40 is rotated to engage the tongue 21A of the follower 21 with the notch 31 of the cam 30 as shown in FIG. 4. Then the selector switch $SW_2$ is closed to start the electric fan. The speed of fan is varied by adjusting the variable resistor $VR_1$, till the desired speed is obtained, then the variable resistor $VR_1$ is set at that position, and then the spindle 40 is rotated counterclockwise (as viewed from top) to set the time. As soon as the spindle 40 is rotated to disengage the tongue 21A from the notch 31, the switch piece 10 is switched to come into contact with contact terminal A as shown in FIG. 3, and thus the first speed changing circuit $E_{11}$ is energized. Then the selector switch $SW_1$ is set to come into contact with tap terminal H, and the fan is thus in operation at a higher speed. During the operation the cam 30 of timing unit TM rotates clockwise, and at the end of pre-set time period the notch 31 engages tongue 21A of follower 21 to break the contact of switch piece 10 with contact terminal A and at the same time to cause switch piece 10 to come into contact with contact terminal B. The first speed changing circuit $E_{11}$ is thus dis-energized and the second speed changing circuit $E_{12}$ is energized instead. As a result the fan operates at the lower speed previously set in the second speed changing circuit $E_{12}$.

In the event one wishes to use the fan for a certain time interval at a lower speed and then at a higher speed, the setting procedure is the same as above except that the first selector switch $SW_1$ will be set at a lower speed with the first speed changing circuit $E_{11}$ and the speed setting with the second speed changing circuit $E_{12}$ will be higher.

In the event one wishes to use the fan for a certain time interval and then to shut it off, the procedure is still the same as above except that the selector switch $SW_2$ is left open during the operation.

In the event one wishes to use the fan at a speed selected with the first speed changing circuit $E_{11}$ without any time setting for a speed change, the spindle 40 is rotated clockwise (viewed from top). Then the cam 30 is rotated clockwise to cause the tongue 21A to disengage from the notch 31, and thus the switch piece 10 is brought into contact with the contact terminal A. In this position the cam 30 remains stationary and the contact terminal A is kept in contact with the switch piece 10 and the first speed changing circuit $E_{11}$ is kept in operation without time setting.

In the event one wishes to use the fan at a speed selected with the second speed changing circuit without any time setting, the timing switch TS is set to keep the tongue 21A engaged in the notch 31, as shown in FIG. 4.

In the event one wishes to use the fan only after a certain time interval, the first selector switch $SW_1$ is set at the OFF position, and the timing switch TS and the second speed changing circuit $E_{12}$ are set as desired according to the procedure previously described, then the fan will start to operate at the desired speed after the set time interval.

Figure 5:
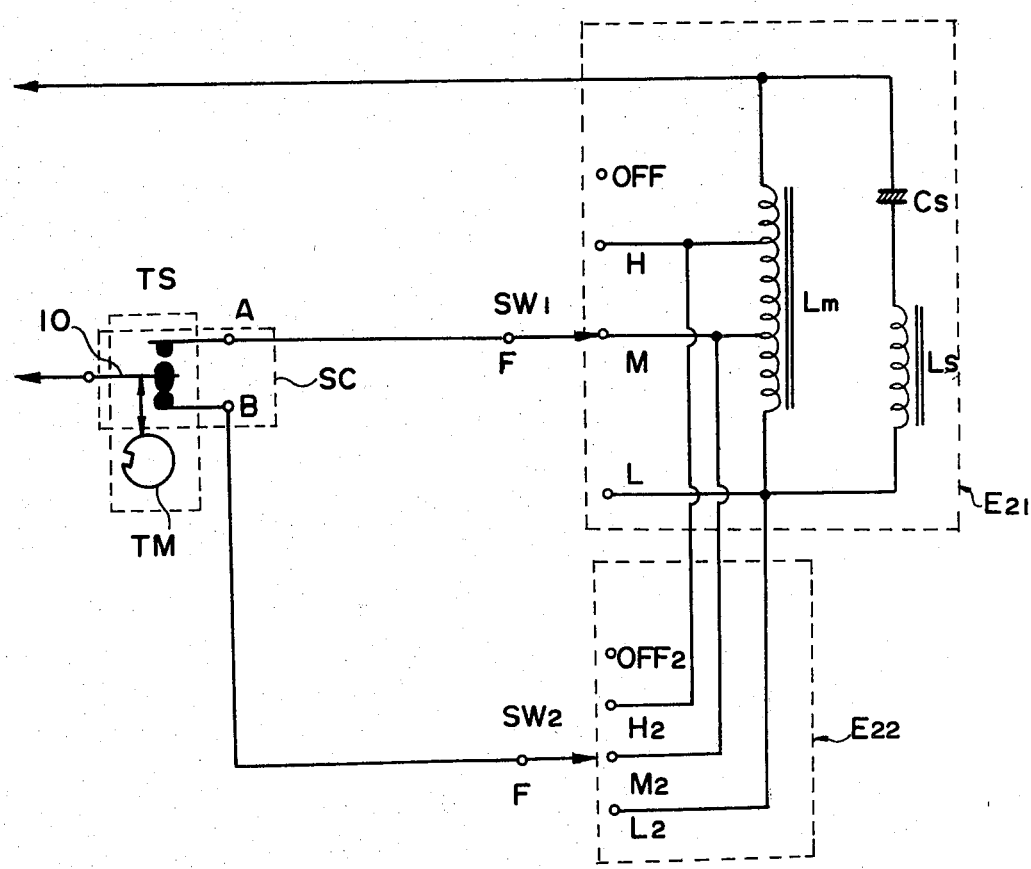
FIG. 5 is a circuit diagram of a second embodiment of the timer-controlled speed changing device of this invention.

FIG. 5 shows a circuit diagram of a second embodiment of this invention in which the first and second speed changing circuit are respectively designated by $E_{21}$ and $E_{22}$. In this embodiment the first speed changing circuit $E_{21}$ is the same as that of first embodiment; and the second speed changing circuit $E_{22}$ comprises a group of terminals $OFF_2$, and $H_2$, $M_2$ and $L_2$ respectively connected to the tap terminals H, M and L of the first speed changing circuit $E_{21}$. The second selector switch $SW_2$ is adapted to be selectively connected with one of said terminals $OFF_2$, $H_2$, $M_2$ and $L_2$ and the fan can be operated with its speed switched from one preset speed with the first speed changing circuit $E_{21}$ to another with the second speed changing circuit $E_{22}$.

Figure 6:
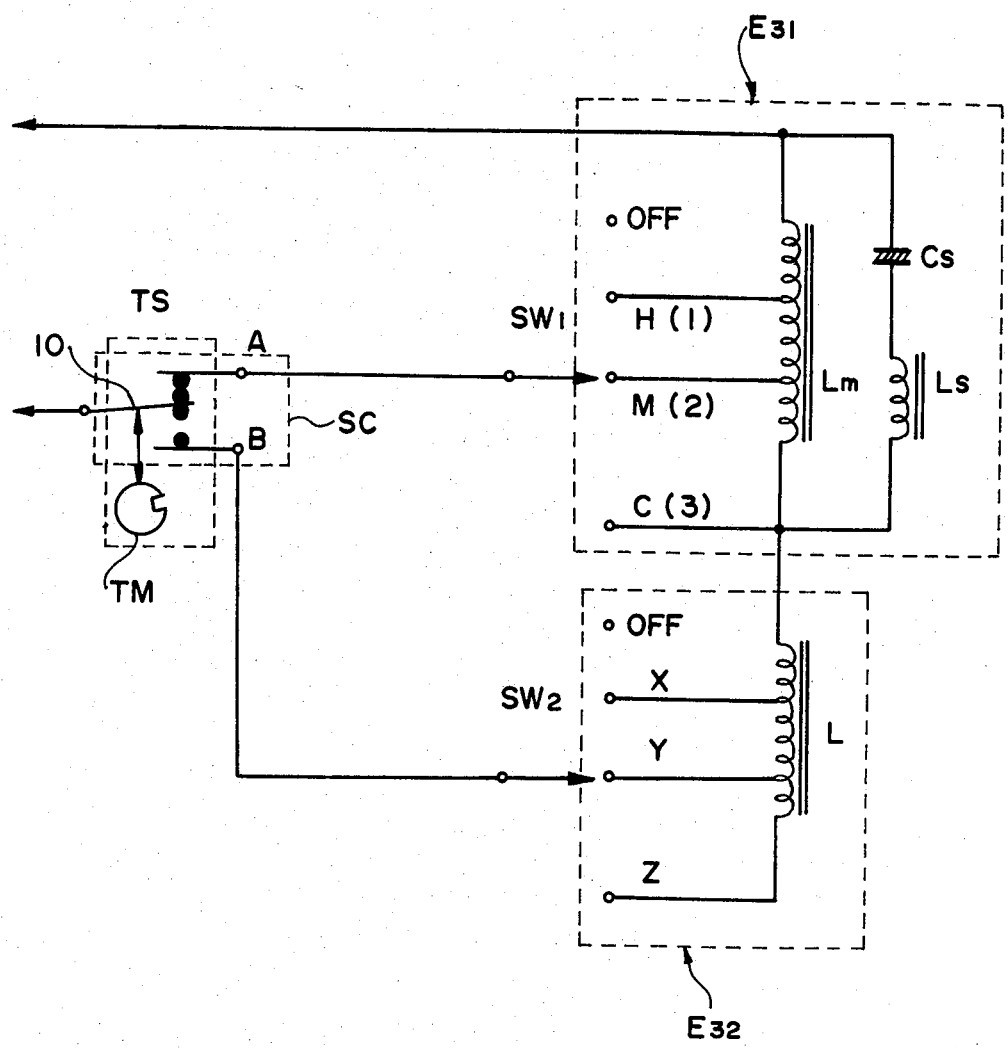
FIG. 6 is a circuit diagram of a third embodiment thereof.

FIG. 6 shows a circuit diagram of a third embodiment of the device of this invention in which the first and second speed changing circuits are respectively designated by $E_{31}$ and $E_{32}$. In this embodiment the first speed changing circuit $E_{31}$ is the same as that of the first embodiment; and the second speed changing circuit $E_{32}$ comprises an inductor or winding L connected to the field winding $L_m$, said inductor or winding L having a plurality of taps drawn therefrom, said taps each having a tap terminal X, Y or Z As shown in FIG. 6. This arrangement provides another speed range or different speed combination to be selected as desired.

Figure 7:
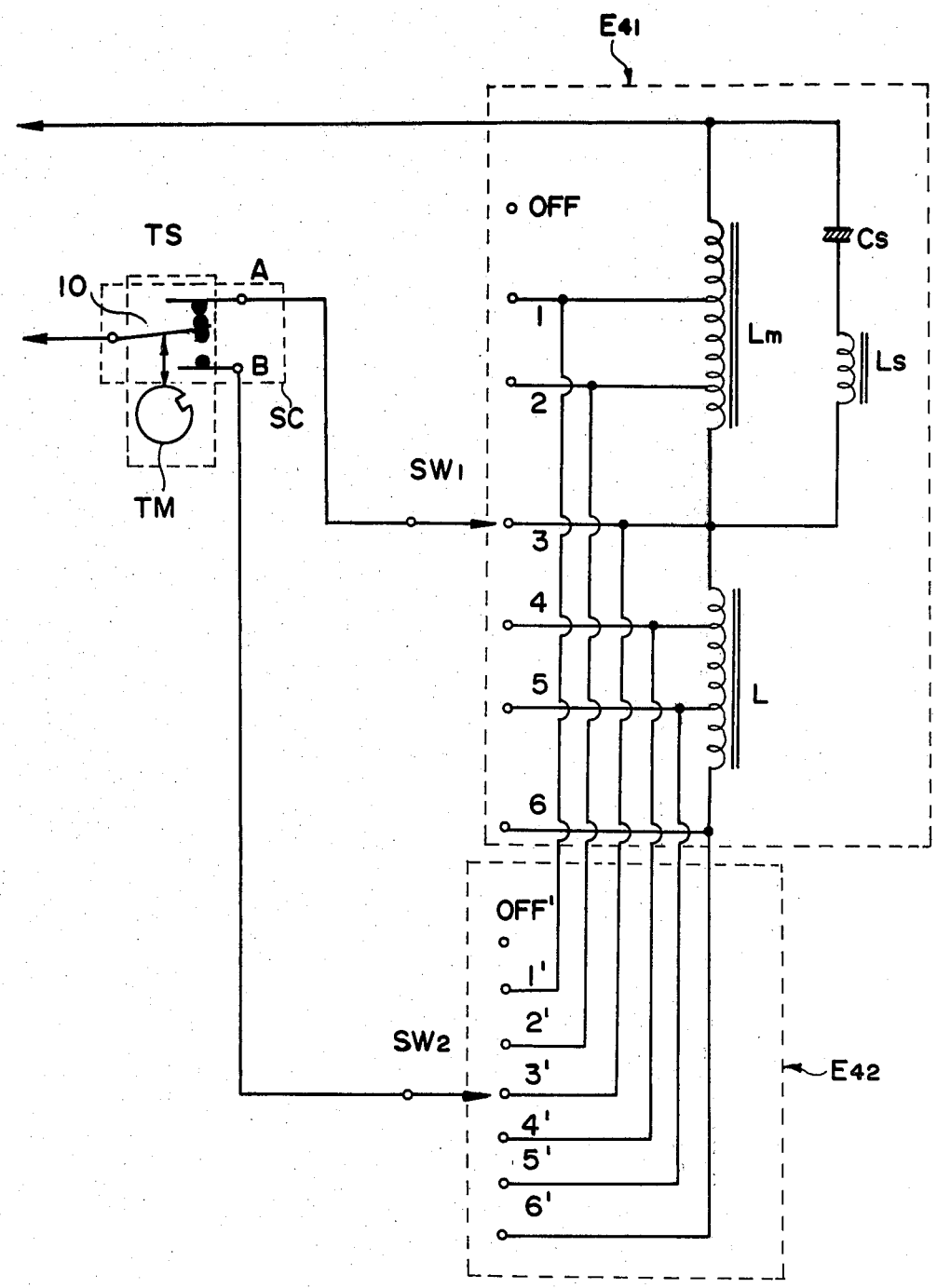
FIG. 7 is a circuit diagram of a fourth embodiment thereof.

FIG. 7 shows a circuit diagram of a fourth embodiment of the device of this invention in which the first and second speed changing circuits are respectively designated by $E_{41}$ and $E_{42}$. In this embodiment the first speed changing circuit $E_{41}$ comprises a field winding $L_m$ of the electric fan, said field winding $L_m$ having taps drawn therefrom, said taps having tap terminals 1, 2; an inductor L connected to said field winding $L_m$, said inductor L having taps drawn therefrom and said taps having tap terminals 4, 5; a terminal 3 drawn from the junction of field winding $L_m$ and the inductor L, and a terminal 6 drawn from the end of the inductor L as shown in FIG. 7. The first speed changing circuit $E_{41}$ is further provided with a starting winding $L_s$ and a starting capacitor $C_s$. The second speed changing circuit $E_{42}$ comprises a group of terminals $1', 2', \ldots 6'$ respectively connected to corresponding tap terminals $1, 2, \ldots 6$ of the first speed changing circuit $E_{41}$. An extra terminal is provided in each of the first and second speed changing circuits designated by OFF, OFF' for disconnecting the circuit from power source.

Figure 8:
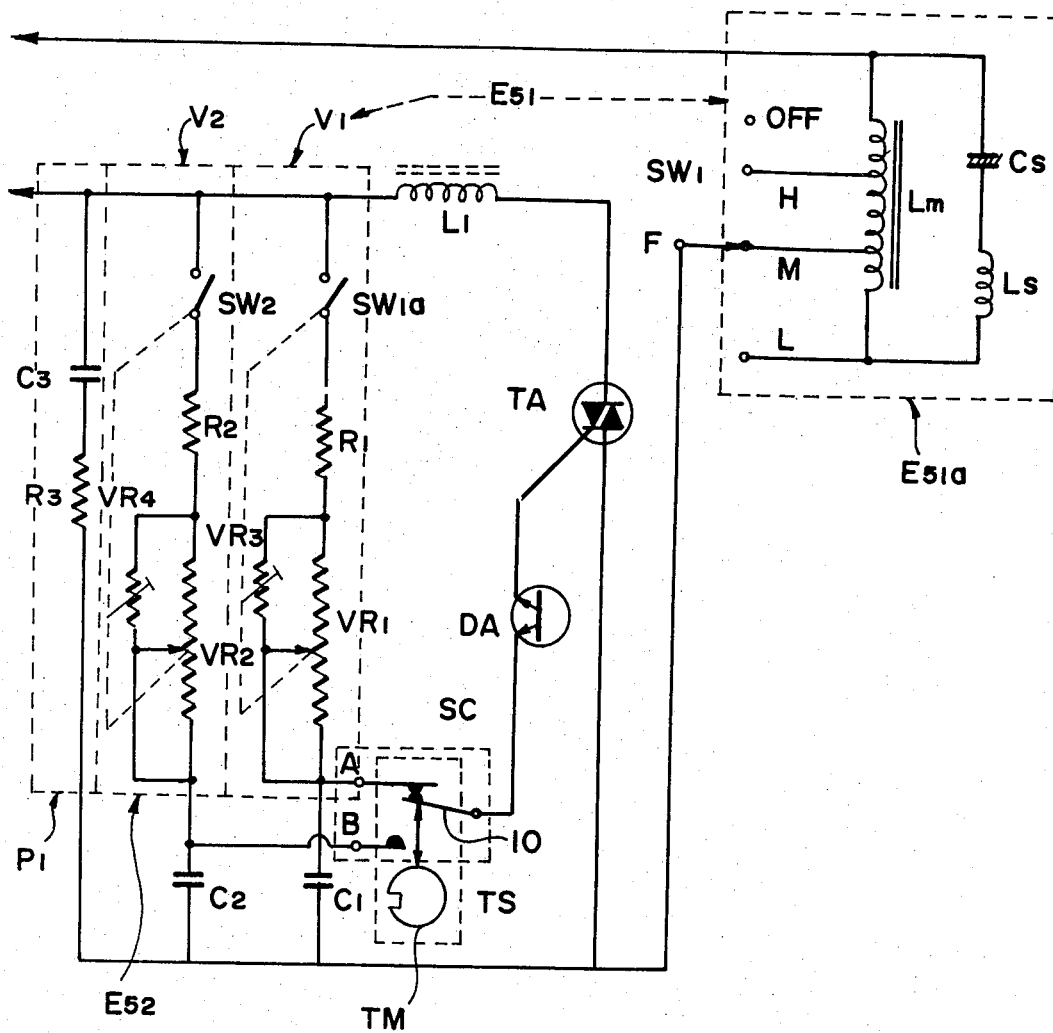
FIG. 8 is a circuit diagram of a fifth embodiment thereof.

FIG. 8 shows a circuit diagram of a fifth embodiment of the device of this invention in which the first and second speed changing circuits are respectively designated by $E_{51}$ and $E_{52}$. In this embodiment the first speed changing circuit comprises a circuit $E_{51a}$ equivalent to the first speed changing circuit $E_{11}$ of the first embodiment, and a first voltage control circuit $V_1$ having an auxilliary first selector switch $SW_{1a}$, resistor $R_1$, a variable resistor $VR_1$, a semi-variable resistor $VR_3$ connected in parallel with variable resistor $VR_1$; an inductor $L_1$ and a triac TA connected in between selector switch $SW_1$ and a power source, said first voltage control circuit $V_1$ being connected in between the first contact terminal A and the power source; a capacitor $C_1$ connected in between said first selector switch $SW_1$ and said first contact terminal A and said first voltage control circuit $V_1$; a diac DA being connected, via its two leads, in between the switch piece 10 of the timing switch TS and the gate of triac TA, and as shown, a first anode of triac TA is selectively connected with $E_{51a}$ and its tap terminals, via $SW_1$, and a second anode of triac TA is connected with one end of inductor $L_1$. The second speed changing circuit comprises a second voltage control circuit $V_2$ having second selector switch $SW_2$, a resistor $R_2$, a variable resistor $VR_2$, a semi-variable resistor $VR_4$ connected in parallel with variable resistor $VR_2$. And, as symbolically shown in FIG. 8, each variable resistor $VR_1$ and $VR_2$ may be operable in association with the operation of $SW_{1a}$ and $SW_2$, respectively. A protection circuit $P_1$ comprising a capacitor $C_3$ and a resistor $R_3$ is provided as shown in FIG. 8. A capacitor $C_2$ is connected in between resistor $R_3$ and variable resistor $VR_2$. The second contact terminal B of the timing switch TS is connected to a mid point in between capacitor $C_2$ and variable resistor $VR_2$. In this arrangement the triac circuit including inductor $L_1$, triac TA and diac DA is used in common in both the first and second speed changing circuits, and either circuit is provided with a variable resistor, therefore a stepless speed change is possible with either the first or second speed changing circuit.

While there have been shown and described preferred embodiment of the present invention, it will be understood that the invention may be embodied otherwise than as herein specifically illustrated or described, and that certain changes in the detail and arrangement may be made without departing from the principles of this invention within the scope of appended claims.

What is claim is:

1. A timer-controlled speed changing device for an electric fan comprising: a timing switch having a switching means and a timing means, said switching means being provided with a first contact terminal, a second contact terminal and a switch piece operable with said timing means, said switch piece being capable of coming into contact with said first or second contact terminal in association with the operation of said timing means; a first electrical circuit comprising a field winding and operable to operate said electric fan when a voltage is supplied thereto, a plurality of taps drawn from said field winding, each tap being provided with a tap terminal, a first voltage control circuit, a first selector switch operable to selectively connect each said tap terminal with said first voltage control circuit through a capacitor means, said first voltage control circuit having a first variable resistor and a first semi-variable resistor connected in parallel with said first variable resistor, a resistor and a first auxiliary switch connected in series with said first variable resistor, said first voltage control circuit having one end connected to said first contact terminal of said switching means and the other end connected to a power source; a triac circuit comprising a triac having a gate and first and second anodes, a diac having two leads and being respectively connected between said switch piece and said gate of said triac, an inductor having one end connected to said second anode of said triac and the other end connected to said power source, said first anode of said triac being connected to said first selector switch; a second voltage control circuit having a second variable resistor and a second semi-variable resistor connected in parallel with said second variable resistor, a second resistor and a second selector switch connected in series with said second variable resistor, said second voltage control circuit having one end connected to said second contact terminal and the other end connected to a power source; and, a protective circuit having a capacitor and resistor connected in series, said protective circuit having one end connected to said second voltage control circuit via a capacitor means and therefrom to said first selector switch, the other end of said protective circuit being connected to said power source.

2. A timer-controlled speed changing device for an electric fan comprising:
   a timing switch having a switching means and a timing means, said switching means being provided with a first contact terminal, a second contact terminal and a switch piece operable with said timing means, said switch piece being capable of coming into contact with said first or second contact terminal in association with the operation of the said timing means; a first electrical circuit having a field winding and operable to operate an electric fan when a voltage is supplied thereto, a plurality of taps drawn from said field winding, each tap being provided with a tap terminal, and a first selector switch connected with said first contact terminal and operable to selectively electrically connect each tap terminal with the said first contact terminal of the said switching means so as to select an operational speed of said electric fan; and
   a second electrical circuit provided with a second selector switch, connective with said second contact terminal, and a speed changing circuit connected with said field winding, the said second selector switch being operable to electrically selectively connect said speed changing circuit with the said second contact terminal of said switching means.

3. A timer-controlled speed changing device as recited in claim 2, wherein said speed changing circuit comprises: a protection circuit having a capacitor and a resistor connected in series with said second selector switch; a voltage control circuit having a variable resistor, a semi-variable resistor connected in parallel with said variable resistor, and a resistor and a capacitor connected in series with the said variable resistor and said semi-variable resistor; a triac circuit having a triac provided with a gate and first and second anodes, a diac and an inductor, said diac having two leads and being respectively connected between one end of said variable resistor and said gate of said triac, said first anode of said triac being connected to one of said tap terminals of said field winding and said second anode being connected to one end of said inductor whose other end is connected to said second selector switch; and, wherein said protection circuit and said voltage control circuit are each respectively shunted across said other end of said inductor and said first anode of said triac, with said second selector switch being operatively connected to said variable resistor.

4. A timer-controlled speed changing device for an electric fan as recited in claim 2, wherein said timing means is provided with a spindle to set the time by rotating said spindle in one direction and thus said switch piece is kept in engagement with said first contact terminal for the duration of a set time period, the said switch piece being disengaged from contact with said first contact terminal and brought into engagement and contact with said second contact terminal after the expiration of said set time period; and, further, said switch piece being brought into and kept in engagement and contact with said first contact terminal without the occurrence of a time setting operation when said spindle is rotated in an opposite direction of said one direction.

5. A timer-controlled speed changing device as recited in claim 2, wherein said speed changing circuit comprises an inductive winding having a plurality of taps drawn therefrom, said plurality of taps each having a tap terminal adapted to be selectively connected to said second contact terminal via the operation of said second selector switch.

6. A timer-controlled speed changing device as recited in claim 5, wherein said plurality of taps drawn from said inductive winding are each provided with a second tap terminal adapted to be selectively connected to said first contact terminal of said switching means via said first selector switch, and each of said plurality of taps drawn from the said field winding being provided with a second terminal to be selectively connected to said second contact terminal of said switching means via the operation of said second selector switch.

* * * * *